United States Patent
Sindzingre et al.

[11] Patent Number: 5,941,448
[45] Date of Patent: Aug. 24, 1999

[54] METHOD FOR DRY FLUXING OF METALLIC SURFACES, BEFORE SOLDERING OR TINNING, USING AN ATMOSPHERE WHICH INCLUDES WATER VAPOR

[75] Inventors: Thierry Sindzingre, Cachan; Stéphane Rabia, Gif sur Yvette; Nicolas Potier; Denis Verbockhaven, both of Paris, all of France

[73] Assignee: L'Air Liquide, Societe Anonyme Pour L'Etude et L'Exploitation Des Procedes Georges Claude, Paris Cedex, France

[21] Appl. No.: 08/984,539

[22] Filed: Dec. 3, 1997

Related U.S. Application Data

[63] Continuation-in-part of application No. 08/660,363, Jun. 7, 1996, abandoned.

[51] Int. Cl.⁶ ............................................. B23K 1/20
[52] U.S. Cl. ........................... 228/206; 228/219; 134/1.1; 156/345; 216/67
[58] Field of Search .................. 228/180.1, 105, 228/206, 219, 220, 223; 156/345; 134/1, 1.1; 118/723 ER; 427/534; 204/157.15, 164, 176; 216/13, 52, 67

[56] References Cited

U.S. PATENT DOCUMENTS

| | | | |
|---|---|---|---|
| 4,273,859 | 6/1981 | Nones et al. | 228/180.21 |
| 5,090,609 | 2/1992 | Nakao et al. | 228/123.1 |
| 5,192,582 | 3/1993 | Liedke et al. | 228/206 |
| 5,255,840 | 10/1993 | Nowotarski | 228/254 |
| 5,458,856 | 10/1995 | Marie et al. | 204/176 |
| 5,525,204 | 6/1996 | Shurboff et al. | 228/180.22 |

FOREIGN PATENT DOCUMENTS

| | | |
|---|---|---|
| 305 241 | 3/1989 | European Pat. Off. |
| 427 020 | 5/1991 | European Pat. Off. |
| 557 756 | 9/1993 | European Pat. Off. |
| 661 110 | 7/1995 | European Pat. Off. |
| 2 274 286 | 7/1994 | United Kingdom |

*Primary Examiner*—Samuel M. Heinrich
*Attorney, Agent, or Firm*—Burns, Doane, Swecker & Mathis, LLP

[57] ABSTRACT

A method for dry fluxing at least one metallic surface of an article comprising the steps of:

a) passing at least one initial gas mixture comprising (1) at least one of an inert gas and a reducing gas and (2) an oxidizing gas mixture comprising water vapor into at least one apparatus for forming excited or unstable gas species, the initial gas mixture including 50 ppm to 6% water vapor;

b) converting the at least one initial gas mixture to at least one primary gas mixture comprising excited or unstable gas species; and c) treating the surface to be fluxed, at a pressure close to atmospheric pressure, with a gaseous treatment atmosphere comprising excited or unstable gas species and substantially free of electrically charged species obtained from the primary gas mixture.

31 Claims, 2 Drawing Sheets

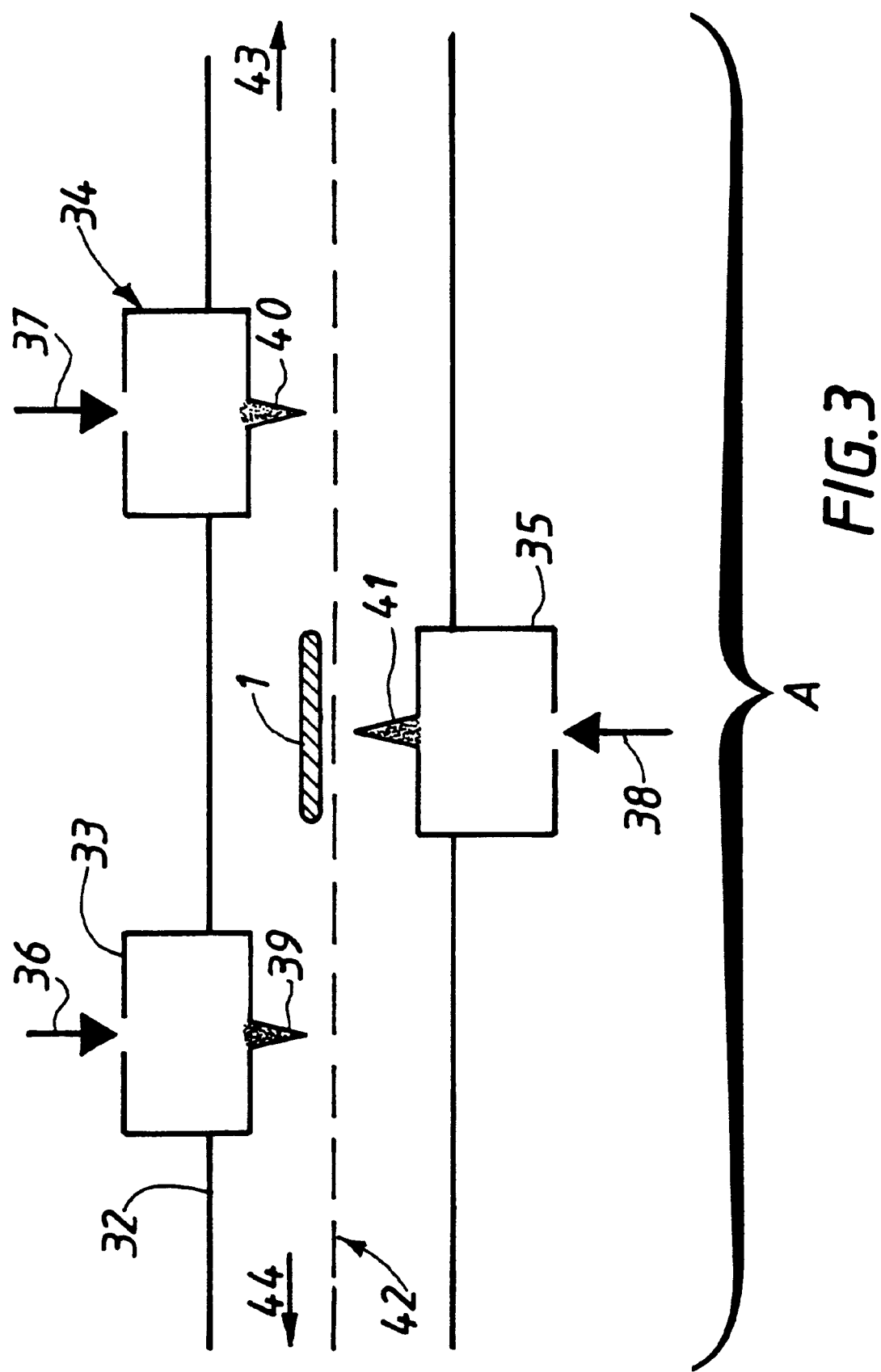

5,941,448

METHOD FOR DRY FLUXING OF METALLIC SURFACES, BEFORE SOLDERING OR TINNING, USING AN ATMOSPHERE WHICH INCLUDES WATER VAPOR

This application is a continuation-in-part of application Ser. No. 08/660,363, which was filed on Jun. 7, 1996, now abandoned, the disclosure of which is hereby incorporated by reference.

BACKGROUND OF THE INVENTION (i) Field of the Invention

The present invention relates to the operation of fluxing metallic surfaces which is generally involved before operations of soldering or tinning in electronics. It thus applies in particular to the fluxing involved before the operations:

- of soldering components onto a circuit (both in the case of inserted components and surface-mounted components),
- of soldering contact strips onto electronic supports, making it possible to connect the support in question to another support (mention may be made here of the example of a hybrid circuit or of a printed circuit which is to be inserted using these contacts into a printed circuit, or a hybrid or printed circuit which can be plugged, using this connection edge, into a connector),
- of soldering circuits into bottoms of casings (involved during encapsulation of such circuits),
- of soldering involved during encapsulation-casing closure procedures,
- of soldering bare chips onto supports such as a printed circuit, hybrid circuits or else multilayer interconnection substrates such as the substrates commonly called MCM (multi-chip modules),
- of tinning circuits or terminations of electronic components.

The expression "tinning" should be understood to mean operations of depositing layers whose composition may be widely varied (including, but not exclusively, depositing layers of the tin/lead type).

(ii) Description of the Related Art

Two of the methods most commonly used for carrying out such soldering (or tinning) operations are called "wave soldering (or tinning)" and "reflow soldering".

In the first case (wave soldering machines), the design of these machines is such that the articles to be soldered or to be tinned are brought into contact with one or more waves of liquid solder which are obtained by circulation of the solder bath contained in a vat through one or more nozzles.

In the case of the second type of method (reflow soldering), which term moreover encompasses a plurality of techniques, use is made no longer of a liquid solder bath but of a soldering paste, containing the solder alloy, which is deposited on the support (for example an electronic circuit before deposition of the components, edges of a casing to be closed, or else casing bottom) and to which a certain quantity of heat is supplied, making it possible to melt the metallic alloy. This heat transfer is most often carried out in a continuous oven.

The role of the fluxing operation before soldering is then to prepare the metallic surfaces to be soldered or tinned (performing actions such as degreasing, deoxidation, decontamination of adsorbed layers or other surface preparation), this being with the aim of facilitating the subsequent wetting of these surfaces by the solder, and also to eliminate oxides which might form on the soldering alloy.

This fluxing operation is most commonly carried out using chemical fluxes which are often obtained from resin bases, supplemented in particular by acidic compounds. It is carried out, in the case of a wave soldering machine, in an upstream zone of the machine (therefore before the support to be treated comes into contact with the solder wave) or else, in the case of reflow soldering, by virtue of the fact that the chemical flux is comprised in the composition of the soldering paste, and the fluxing phase is then carried out during a first part of the thermal cycle employed.

After soldering, flux residues then remain on the article, often requiring the manufacturer to carry out a cleaning operation, most often using chlorinated solvents which are highly controversial in the context of the "Montreal Protocol" and its subsequent revisions.

Among the ways envisaged for finding a replacement solution to the use of these compounds, mention may be made of dry fluxing processes, such as plasma fluxing of the surfaces before soldering, thereby avoiding the use of chemical fluxes and therefore the actual requirement for a downstream cleaning operation. The mixtures envisaged use, in particular, hydrogen.

In this field, mention may be made of document EP-A-0,427,020, which proposes treating assembly parts to be soldered using a plasma of a process gas, recommending the use of low pressures for this treatment "with the aim of avoiding thermal damage to the assembly parts". All the examples given, in conjunction with the figures provided, relate to pressure conditions lying in the range of 30–100 Pa.

The same comment can be made in regard to document EP-A-0,371,693, which relates to a method of fluxing metallic surfaces before soldering using microwave plasma containing hydrogen. Here again, it is recommended to use low pressures "in order to make it possible to limit the level of residual oxygen in the plasma".

This consensus of opinion in favor of the use of low pressure conditions for carrying out these plasma fluxing operations, despite the drawbacks which are in particular linked with the cost of obtaining such pressures or else with the difficulty of installing the corresponding infrastructures in an industrial production line, is undoubtedly linked with the technical and technological difficulty of obtaining, at atmospheric pressure, plasmas which give performance comparable to that which is traditionally obtained at low pressure.

In this context, the Applicant Company proposed, in document FR-A-2,697,456, a method of plasma fluxing metallic surfaces before soldering, at atmospheric pressure and using, in order to create the plasma, a microwave source or else a dielectric-barrier discharge transferred via slots placed suitably in a dielectric layer placed above the article to be treated. Although this document provides an advantageous solution to the problem in question, the Applicant Company has demonstrated the fact that the proposed method might be improved, especially as regards:

- its efficiency (ratio of power input for creating the plasma to the density of species produced which actually interact with the support to be treated), or else the permissible power density (in the case of dielectric-barrier discharge, it reaches only a few W per $cm^2$ of dielectric) which, if they were to be enhanced, might permit shorter treatment times;
- and also the fact of limiting "geometrical" factors: in the case of corona discharge, the electrode/sample distance is highly critical and must be kept very small, which may cause problems in the case of substrates whose surface structure is relatively convoluted; in the case of microwave discharge, it gives rise to the formation of a plasma-generating spot which has defined dimensions limited by the plasma source;

moreover, a plasma as created in this document contains, by definition, ionic species and electrons (and therefore electrically charged species) which are always difficult to use on electronic components.

Continuing its work on this subject, the Applicant Company then more recently proposed, in the French Patent Application published on Jun. 16, 1995 under number FR-A-2,713,528, an improved method for dry fluxing a metallic surface before soldering or tinning using an alloy, which is noteworthy in that it employs the following steps:

a) an initial gas mixture comprising an inert gas and/or a reducing gas and/or an oxidizing gas is passed through at least one apparatus for forming excited or unstable gas species, in order to obtain a primary gas mixture at the outlet of the apparatus;

b) the surface to be fluxed is treated, at a pressure close to atmospheric pressure, with a gaseous treatment atmosphere comprising excited or unstable species and substantially free of electrically charged species which is obtained from the primary gas mixture in question.

The examples developed in this document clearly demonstrate that it is possible, using this method, in particular:

to operate substantially at atmospheric pressure, to obtain a high degree of flexibility with regard to the distance between the object to be treated and the device used for carrying out this treatment, to avoid contact of the articles with charged species, to offer an improved power density, making it possible to achieve an enhanced treatment rate.

The treatment atmosphere which is obtained from the primary gas mixture, itself obtained at the gas outlet of an apparatus for forming excited or unstable gas species, may moreover according to this document also comprise, if appropriate, an adjacent gas mixture which has not passed through the apparatus.

This configuration may therefore be referred to as a "post-discharge" configuration since the primary component of the treatment atmosphere, which comprises excited or unstable gas species, is obtained at the outlet of the apparatus, which ensures the substantial absence of any electrically charged species in this primary component. The adjacent component of the treatment atmosphere, which has not passed through the apparatus, is a fortiori free thereof.

This configuration furthermore makes it possible to separate clearly the site of the generation of the primary component of the atmosphere from the site at which it is used, which has a not inconsiderable advantage in terms of contamination of the apparatus (avoiding various releases resulting from the operation of fluxing the surface from contaminating the interior of the apparatus, for example its electrodes), and also in terms of reproducibility of the atmosphere encountered by the article.

Finally, the article, which is not treated within the apparatus (for example within the discharge between the electrodes), benefits from much better flexibility with regard to the "distance" aspect mentioned above.

In this document, this method was more particularly exemplified and illustrated with the aid of a particular device for forming excited or unstable gas molecules, operating substantially at atmospheric pressure, which the Applicant Company had previously developed and which is described in document FR-A-2,692,730.

SUMMARY AND OBJECTS OF THE INVENTION

The Applicant Company has since continued its work on this subject, with a view to further improving the method for dry fluxing a metallic surface before soldering or tinning according to document FR-A-2,713,528, in particular with the aim of further lowering the defect rate of the products (for example printed circuits) obtained at the end of the subsequent soldering or tinning step.

This work then clearly, and entirely unexpectedly, showed that the "water vapor" species $H_2O$ could play a specific and particularly advantageous role in the obtained fluxing performance and therefore the subsequent soldering performance (for example wave soldering).

The method for dry fluxing a metallic surface before soldering or tinning using an alloy, according to the present invention, is therefore characterized in that:

a) an initial gas mixture, comprising an inert gas and/or a reducing gas and including an oxidizing gas mixture which includes water vapor, is passed through at least one apparatus for formation of excited or unstable gas species, in order to obtain a primary gas mixture, at the outlet of the apparatus, the water vapor content of the initial gas mixture being in the range [50 ppm, 6%];

b) the surface to be fluxed is treated, at a pressure close to atmospheric pressure, with a gaseous treatment atmosphere comprising excited or unstable gas species and substantially free of electrically charged species which is obtained from the primary gas mixture.

According to the invention, the term "metallic surface" is intended to mean any type of metallic surface which may be involved in such soldering or tinning operations, whether, for example, made of steel, copper, aluminium, tin, lead, tin/lead, tin/lead/silver, or else alloys such as Kovar, this list being, of course, only an indication and in no way limiting. Mention may also be made of the various types of finishing of electronic circuits such as pretinning, Ni/Au finishing, or else passivated copper.

The article containing the article to be fluxed may consist of any article which may be involved in such soldering or tinning operations, whether, for example, it is an electronic circuit onto which components have been attached with a view to soldering them (whether they are inserted components or surface-mounted components), or else a contact-strip/electronic support pairing (soldering the strip onto the support), or else supports such as a printed circuit, hybrid circuits or else multilayer interconnection substrates such as the substrates commonly called MCM (multi-chip modules) onto which bare chips have been attached in order to be soldered thereto, or else electronic components to be tinned.

The soldering or tinning "alloy" according to the invention will consist of any composition which might be envisaged for such operations (for example reflow soldering or in a wave soldering machine, or else wave tinning), such as, for example, Sn-Pb, Sn-Pb-Ag, Pb-In etc.

According to the invention, the term "pressure close to atmospheric pressure" is intended to mean a pressure advantageously lying in the range $[0.1 \times 10^5 \text{ Pa}, 3 \times 10^5 \text{ Pa}]$.

According to the invention, the term "electrically charged species" is intended to mean ions or electrons. As explained above, the treatment atmosphere according to the invention is therefore distinguished from the plasma atmospheres previously described in the literature in that it is substantially free of electrically charged species, that is to say ions or electrons.

The treatment atmosphere, which is obtained from the primary gas mixture, may also comprise, if appropriate, an adjacent gas mixture, the primary gas mixture being obtained at the gas outlet of the apparatus for forming excited or unstable gas species in which the initial gas mixture has been converted, whereas the adjacent gas mixture has not itself passed through the apparatus.

As previously developed in the paragraph given over to document FR-9,315,112, this configuration can be termed "post-discharge" with all the advantages which result therefrom and which have already been listed.

The inert gas may, for example, consist of nitrogen, argon, helium or a mixture of such inert gases. The reducing gas may, for example, consist of hydrogen, $CH_4$ or else ammonia or a mixture of such reducing gases.

It will be appreciated that amoniac could be present inside the initial mixture due to an addition performed on purpose but also (and/or) due to a recirculation of the treatment atmosphere. Depending on the composition of the initial gaseous mixture, amoniac can be one of the species formed inside the discharge and therefore present inside the treatment atmosphere and then forming part of the initial gaseous mixture due to a recirculation.

In addition to water vapor, the oxidizing gas mixture may, for example, also contain oxygen, or $CO_2$, or else $N_2O$, or a mixture of such species.

It will also be appreciated that all or a part of the initial gas mixture can be formed by recycling all or part of the treatment atmosphere. Such recirculation can be achieved using fans or by relying on a ventural recirculation as described in copending application Ser. No. 08/877,914, the disclosure of which is hereby incorporated by reference.

The list of species given in each category being, of course, only an indication and in no way limiting.

The apparatus according to the invention consists of any device making it possible to "excite" an initial gas mixture in order to obtain, after conversion in the apparatus, and at the gas outlet of the apparatus, another gas mixture (referred to as the primary gas mixture) including unstable or excited species, the latter gas mixture being substantially free of electrically charged species. Such excitation may, for example, be obtained by electrical discharge, for example of the corona discharge type.

Document FR-A-2,692,730 in the name of the Applicant Company, mentioned above, describes an apparatus for forming excited or unstable gas molecules which is suitable for implementing the process according to the present invention.

As will be clearly apparent to the person skilled in the art on reading the above description, the water vapor content of the initial gas mixture should be adapted in each case, in particular to the content of the rest of the initial gas mixture (for example its reducing gas, for example hydrogen, content), and also to the type of article to be treated (for example the type of surface condition and therefore the finishing of the electronic circuit to be fluxed before wave soldering).

Nevertheless, it has been found that the water vapor content of the initial gas mixture is advantageously in the range [50 ppm, 6%], preferably in the range [100 ppm, 1%], and even more preferably in the range [500 ppm, 5000 ppm].

As previously indicated, the oxidizing gas mixture may comprise another oxidizing species, for example oxygen, in addition to water vapor. In the latter case, the oxygen content of the initial gas mixture is preferably kept less than a few hundreds of ppm.

According to one of the embodiments of the invention, the initial gas mixture consists of a nitrogen/hydrogen/water vapor mixture.

According to another of the embodiments of the invention, the initial gas mixture consists of a nitrogen/hydrogen/water vapor/oxygen mixture.

When the initial gas mixture includes hydrogen, its hydrogen content will advantageously lie in the range [1000 ppm, 50%], and preferably less than or equal to 10%.

The fluxing method according to the invention makes it possible to carry out the treatment with the aid of primary mixture obtained at the gas outlet of a single apparatus, or of a plurality of apparatuses placed in parallel over the width of the article to be treated, or else successively with the aid of primary mixtures obtained at gas outlets of a plurality of apparatuses placed in series.

Similarly, as will be clearly apparent to the person skilled in the art, the method according to the invention is applicable, according to the requirements expressed by the user, both to the treatment of a single one of the faces of the article to be treated and to the case in which it is desired to flux the article on both of its faces. In the latter case, it will be suitable to arrange the required apparatuses in front of each face of the article.

The adjacent mixture according to the invention may consist of any gas or gas mixture, for example of an inert gas or a mixture of inert gases making it possible to maintain, if required, a protective atmosphere around the samples, or else a reducing gas or an oxidizing gas, or even a mixture of gases belonging to one of these three categories.

According to another aspect of the invention, the surface to be treated is heated to a temperature of between ambient temperature and the melting temperature of the alloy used in order to carry out the subsequent soldering or tinning operation. This upper limit will therefore depend on the alloy used, and it will, for example, lie in the vicinity of 180° C. in the case of the Sn63-Pb37 or Sn62-Pb36-Ag2 alloys conventionally used. Advantageously, and depending on the particular type of article or support treated, in order to limit the growth of intermetallics, efforts will be made to adopt a temperature which is not too close to the melting temperature of the alloy used, for example not exceeding 160° C. in the case of the Sn63-Pb37 or Sn62Pb36-Ag2 alloys used.

According to one of the aspects of the invention, the article having the metallic surface or surfaces to be treated is brought in front of the gas outlet of the apparatus, if appropriate in front of the gas outlets of a plurality of apparatuses placed in parallel over the width of the article and/or successively in front of the gas outlets of a plurality of apparatus placed in series, by a conveyor system which passes through an internal space which is bounded by a covering structure (for example a tunnel or a set of elementary coverings) and is isolated from the surrounding atmosphere, the structure being connected in a leaktight manner to the apparatus or apparatuses or including the apparatus or apparatuses.

The same comment already made hereinabove is applicable here, regarding double-sided treatment (here again, it is sufficient to employ the requisite number and arrangement of apparatuses in front of each face of the article).

When the article having the metallic surface or surfaces to be treated is brought in front of the gas outlets of a plurality of apparatuses placed in parallel over the width of the article and/or successively in front of the gas outlets of a plurality of apparatuses placed in series, at least one of these apparatuses converts an initial gas mixture which comprises an inert gas and/or a reducing gas, and an oxidizing gas mixture which includes water vapor. The initial gas mixture converted in the other apparatuses may then comprise an inert gas and/or a reducing gas and/or an oxidizing gas.

According to one of the embodiments of the invention, the apparatus (or at least one of the apparatuses) in which the initial gas mixture is converted is the seat of an electric discharge created between a first electrode and a second electrode, a layer of a dielectric material being arranged on the surface of at least one of the electrodes, facing the other electrode, with the initial gas mixture passing through the discharge transversely to the electrodes.

The power used in the apparatus, normalized per unit surface area of dielectric, will then advantageously be greater than or equal to 1 W/cm$^2$, preferably greater than or equal to 10 W/cm$^2$, and most often in the range [10 W/cm$^2$, 100 W/cm$^2$].

According to one of the embodiments of the invention, the treatment atmosphere successively encountered by the article to be treated along the conveyor is zoned in the following manner:

a) at least one of the apparatuses for forming excited or unstable gas species converts a different initial gas mixture from that converted by the apparatus preceding it in the said structure, and/or b) the adjacent gas mixture employed in at least one of the apparatuses for forming excited or unstable gas species is different from that employed in the apparatus preceding it in the said structure.

According to one of the embodiments of the invention, steps a) and b) above may relate to one and the same apparatus.

It will thus, for example, be possible to use mixtures having a reducing power which increases from one apparatus to another.

According to one of the aspects of the invention, at the exit of the structure, the article enters a machine in which the soldering or tinning operation is carried out, the article being, if appropriate, kept under a protective atmosphere between the exit of the structure and the entry of the machine. The term protective atmosphere is in this case intended to mean an essentially inert atmosphere in which the residual oxygen concentration does not exceed a few hundreds of ppm, or even 100 ppm.

According to another aspect of the invention, the soldering or tinning operation is carried out within the actual covering structure (for example a tunnel), downstream of the apparatus.

According to one of the embodiments of the invention, the soldering or tinning operation before which the fluxing according to the invention takes place, is performed in wave mode and the article having the metallic surface to be treated is an electronic circuit, each face of which is brought in front of the gas outlet of at least one apparatus for forming excited or unstable gas species by the conveyor system.

Advantageously, the upper face of the electronic circuit to be treated is brought successively in front of the gas outlets of at least two apparatuses for forming excited or unstable gas species.

In this case of applying the invention to the case of fluxing before wave soldering, it should be pointed out (whether the soldering operation is carried out in a separate machine downstream or within the same covering structure), that the fluxing operation according to the invention may be coupled with the step of preheating the circuits or supports which is usually present in wave soldering machines between the chemical fluxing step and the soldering pot. According to the invention, successions of the following type may then be envisaged:

fluxing according to the invention (cold or hot) followed by a preheating operation (followed by soldering or tinning);

a preheating operation followed by fluxing according to the invention (cold or hot) (followed by soldering or tinning);

fluxing according to the invention (cold), followed by a preheating operation, followed by fluxing according to the invention (hot) (followed by soldering or tinning), this list of successions being, of course, only illustrative of the numerous possibilities afforded by the invention, and in no way limiting.

Downstream of the point where the circuit is brought into contact with the solder wave or waves, that is to say downstream of the soldering operation proper, one of the faces of the circuit may, if appropriate, be brought in front of the gas outlet of at least one apparatus (which may be termed the "downstream" apparatus) for forming excited or unstable gas species, through which an initial gas mixture (which may here again be referred to as the "downstream" initial gas mixture) comprising an inert gas and/or a reducing gas and/or an oxidizing gas is passed, in order to obtain, at the gas outlet of the apparatus, a "downstream" primary gas mixture, comprising excited or unstable species and substantially free of electrically charged species, this making it possible, if necessary, to carry out aftercleaning of the surface of the circuit.

A further envisageable case is that, during all or part of the contact with the solder wave or waves, at least one of the faces of the circuit is brought into contact with the gas outlet of at least one apparatus which can be referred to as the "additional" apparatus for forming excited or unstable gas species, through which an initial gas mixture (which can also be referred to as "additional"), comprising an inert gas and/or a reducing gas and/or an oxidizing gas, is passed, in order to obtain, at the gas outlet of the apparatus, an "additional" primary gas mixture comprising excited or unstable gas species and substantially free of electrically charged species.

As will be clearly apparent to the person skilled in the art, this "additional" treatment, carried out actually during the soldering, may appear highly advantageous with a view, in particular, to substantially eliminating the oxides which might form on the soldering alloy.

According to one aspect of the invention, provision is made to set up a regime, which can be referred to as "waiting", of the treatment carried out according to the invention before soldering or tinning, when the soldering or tinning operation is to be temporarily interrupted.

It is thus possible according to the invention to provide for situations in which, for example as a result of an intentional action by the user, or else because no circuit or article has been detected at the entry of the structure during a time period which has been predetermined, at least one of the following measures is initiated:

the supply of primary gas mixture to each apparatus is stopped;

a reduced flow rate of the primary gas mixture which circulates in the apparatus in question (for example a few % or a few tens of % of the flow rate circulating in the nominal regime used for treatment) is maintained in each apparatus;

when an adjacent gas mixture is employed in at least one of the apparatuses, the supply of adjacent gas mixture is stopped in at least one of these apparatuses;

instead of the primary gas mixture which circulates in the apparatus in question, a primary gas mixture which can be referred to as the "standby" is passed through each apparatus (for example a neutral gas or else a neutral gas/hydrogen mixture, etc.);

each apparatus is switched from the treatment regime which it was in to a standby regime in which the power density used therein is only a few W/cm$^2$.

Other characteristics and advantages of the present invention will emerge from the following description of embodiments, which is given by way of illustration but without implying any limitation, and given with reference to the appended drawings, in which:

BRIEF DESCRIPTION OF THE DRAWINGS

FIG. 3 is a schematic representation of another installation suitable for implementing the method according to the invention, in which an electronic circuit, intended to be subsequently soldered in a wave soldering machine, successively encounters, in a covering structure which is here of the tunnel type, three apparatuses for forming excited or unstable gas species, in series, two of these apparatuses on its upper face and the third apparatus on its lower face.

DETAILED DESCRIPTION OF PREFERRED EMBODIMENTS

Figure 1:
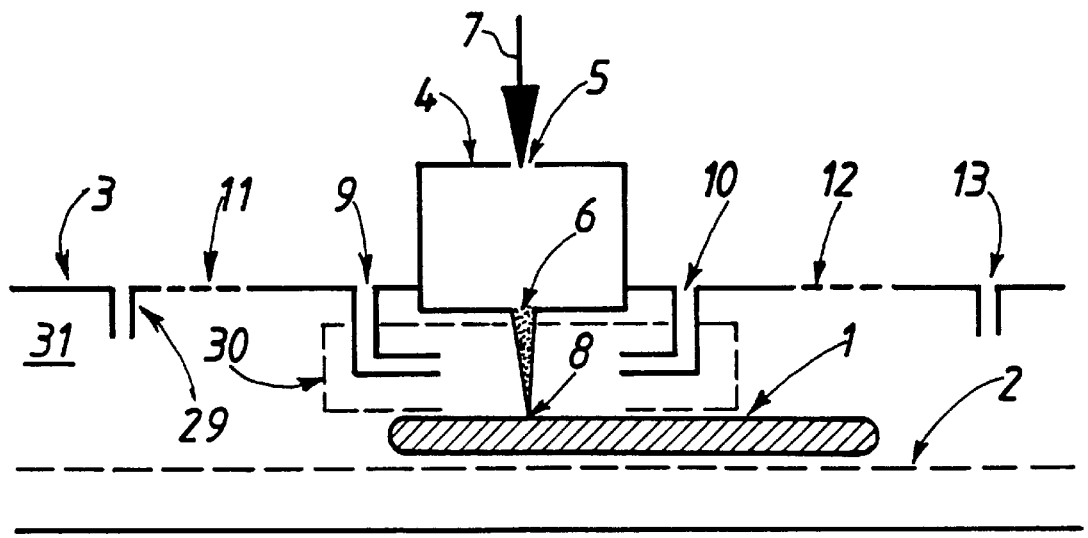
FIG. 1 is a schematic representation of an installation which is suitable for implementing the method according to the invention.

FIG. 1 shows the presence of an article 1 having the metallic surface or surfaces to be fluxed, brought using a conveyor belt 2 in front of the gas outlet 6 of an apparatus 4 for forming excited or unstable gas species.

The conveyor system 2 passes through an internal space 31, bounded by a tunnel 3, advantageously connected in a leaktight manner to the apparatus 4.

At 8 is diagrammatically shown the primary gas mixture obtained at the outlet 6 of the apparatus. The primary gas mixture 8 is obtained from an initial gas mixture 7 which enters the apparatus through its gas inlet 5.

The embodiment represented in FIG. 1 also shows the presence of inlets 9, 10 for adjacent gas mixtures. The gaseous atmosphere obtained from the adjacent gas mixtures 9, 10 and from the primary gas mixture 8 constitutes the treatment atmosphere 30 according to the invention.

The presence is noted in the embodiment represented in FIG. 1 of additional apparatuses for forming excited or unstable gas species, not shown, at 11 and 12, in series with the first apparatus 4 and successively encountered by the article 1.

The installation is then, if appropriate, completed by other adjacent gas mixture inlets such as those represented at 13 and 29.

The installation is furthermore provided, if appropriate, with a means, not represented in FIG. 1, for heating the article 1. Infrared lamps present in the tunnel or convection heating (hot tunnel walls) or else the fact that the article is placed on a heating substrate holder may, for example, be envisaged for this heating means.

Figure 2:
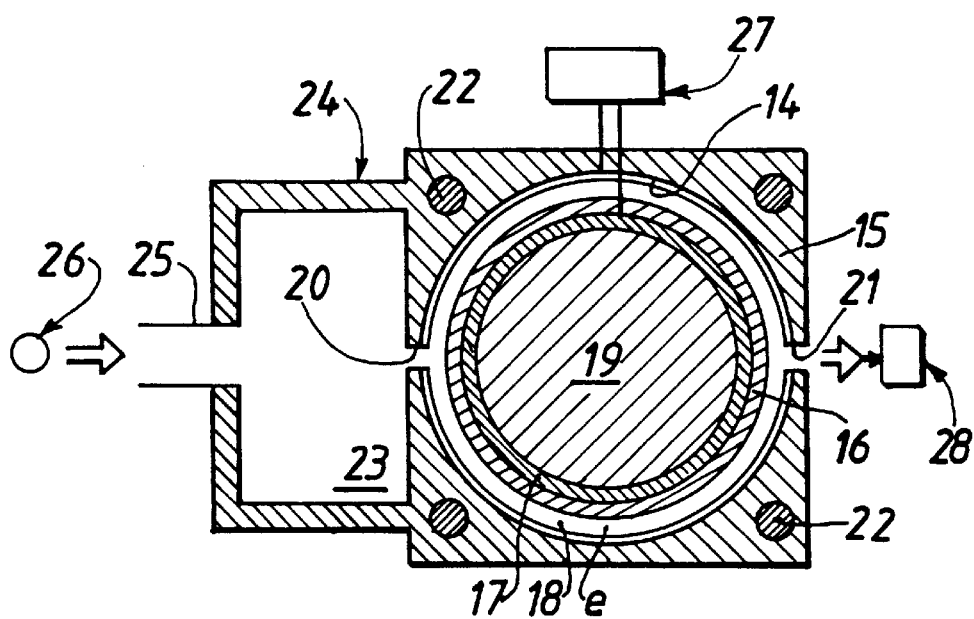
FIG. 2 schematically represents, in section, an example of an apparatus for forming excited or unstable gas species which is suitable for implementing the method according to the invention.

As represented in the embodiment in FIG. 2, the apparatus for forming excited or unstable gas species this embodiment is of cylindrical geometry and comprises a first tubular electrode 14, formed for example by an internal face of a metallic block 15, for in which an assembly comprising a tube 16 of dielectric material, for example of ceramic, is placed concentrically, a second electrode 17 whose thickness is exaggerated for clarity in FIG. 12 being deposited by metallization on the internal face dielectric tube.

The assembly comprising the dielectric 16 and the second electrode 17 thus bounds, with the first electrode 14, a tubular gas passage 18 and, internally, an internal volume 19 in which a coolant is circulated, advantageously a Freon for its electronegative character or else deionized water. The internal gas passage 18 has an axial extent of less than 1 m, typically less than 50 cm, and its radial thickness e does not exceed 3 mm and is typically less than 2.5 mm.

The block 15 includes, substantially diametrically opposite, two longitudinal slots 20 and 21 respectively forming the inlet for the initial gas to be excited in passage 18 and the outlet for the primary gas flux containing excited or unstable gas species.

The slots 20 and 21 extend over the entire axial length of the cavity 18 and have a width which, in the case of the embodiment represented in FIG. 2, does not exceed the thickness e and is typically substantially identical to the latter. The body 15 advantageously includes, at the periphery of the first electrode 14, a plurality of ducts 22 for passage of a coolant, for example water. The gas inlet 20 communicates with a homogenization chamber or plenum 23 formed in a casing 24 attached to the block 15 and including a tube 25 for supplying initial gas originating from an initial gas source 26 and therefore at a pressure which may vary, depending on this source, typically from a few bar to 100 or 200 bar. The electrodes 14 and 17 are connected to a high-voltage and high-frequency electrical generator 27 operating at a frequency advantageously greater than 15 kHz and delivering a power of, for example, the order of 10 kW. It may furthermore be advantageous to express this power delivered by the generator by normalizing it per unit surface area of dielectric.

The gas flux containing the excited species which is available at the gas outlet 21 is sent to a user station 28, for example for fluxing metallic surfaces according to the invention.

The installation diagrammatically represented in FIG. 3 illustrates the case of an installation for fluxing according to the invention, taking place before a subsequent operation which may, for example, be a wave soldering operation. Each circuit to be soldered is here conveyed inside a tunnel 32, along a direction 42. The system for gripping the circuits (for example of the type including two chains with fingers gripping the circuit on either side of the tunnel) has not been represented, for reasons of clarity, but such conveyor systems are widely known to the person skilled in the art of wave soldering machines.

The circuit then successively encounters the gas outlets of three apparatuses 33, 34, 35 for forming excited or unstable gas species (in which the gas mixtures 36, 37, 38 of the initial type are respectively treated), and more precisely the primary mixtures 39, 41 and 40 resulting therefrom. The primary mixtures 39 and 40 more specifically treat the upper face of the circuit, whereas the primary mixture 41 more specifically treats the lower face of this circuit.

The installation in FIG. 3 has been represented independently of any wave soldering machine, but as broadly developed above, numerous possible arrangements of this installation may be envisaged:

the fact, for example, that at the exit of this installation and of the tunnel structure 32 which it includes, the circuit enters a wave soldering machine (direction referenced 43), the circuit being, if appropriate, kept under a protective atmosphere between the exit of the tunnel and the entry of the machine;

or else the fact that the fluxing according to the invention and the soldering or tinning operation are carried out within the same tunnel structure 32 (the soldering vat being located downstream of the fluxing and therefore downstream of the apparatus 34 which is the last one encountered). For this case, the direction of the entry of the machine has been symbolized by the reference 44 and the direction of the location of the soldering bath has been symbolized by the reference 43.

As mentioned in detail above, the assembly A consisting of the tunnel portion incorporating the three apparatuses 33, 34, 35 for forming excited or unstable gas species will then necessarily be located upstream of the soldering bath but may be, depending on the case, located upstream or downstream of a circuit preheating step.

An installation such as that described with reference to FIG. 3, incorporating three apparatuses such as that described with reference to FIG. 2, was used for carrying out examples of implementation of the invention, as well as comparative examples detailed below.

The common implementation conditions of these examples are as follows:

the installation in FIG. 3 was incorporated within a wave soldering machine (from which the chemical fluxer had been removed) having a tunnel over its entire length, between a preheating zone (maintaining a temperature at the circuits of the order of 150 to 160° C.) and the Sn63-Pb37 solder pot, speed of advance of the circuits past each apparatus: 8 cm/min, each apparatus uses a power of the order of 3 kW, corresponding to a power density of the order of 35 W/cm$^2$;

at each of the three apparatuses, the circuit was heated (circuit temperature kept at a level of the order of 150 to 160° C.) by the presence of a radiating tube opposite each apparatus (at each apparatus, the circuit is therefore "sandwiched" between the apparatus and a radiating tube, not shown in FIG. 3), the fluxed and wave-soldered circuits were of the printed circuit type (PCB) which were pretinned, doublesided with metallized holes including components from two categories: "surface-mounted" and "wire-bonded";

for each example described below, the number of soldering defects was counted, for each circuit, on the wired components which were particularly difficult to treat (defect involving the solder rising in the metallized holes). Each example therefore gives the average number of defects observed per board, for at least 10 soldered boards, in the knowledge that one board contains 100 soldering points of the "metallized hole" type.

For the first example of implementation, the operating conditions and the results obtained are as follows:

the initial mixture converted in the first and second apparatuses: 17 m$^3$/h of an N$_2$/H$_2$ mixture with 4% of hydrogen;

initial mixture converted in the third apparatus (34): 17m$^3$/h of an N$_2$/H$_2$/H$_2$O mixture with 4% of hydrogen and 1000 ppm of H$_2$O;

average defect rate: <10%

For the second example the operating conditions and the results obtained are as follows:

initial mixture converted in each of the three apparatuses: 17 m$^3$/h of an N$_2$/H$_2$ mixture with 4% of hydrogen;

average defect rate: ≈40%

For a third example, the operating conditions and the results obtained are as follows:

the initial mixture converted in the first and second apparatuses: 17 m$^3$/h of an N$_2$/H$_2$ mixture with 4% of hydrogen;

initial mixture converted in the third apparatus (34): 17 m$^3$/h of an N$_2$/H$_2$/H$_2$O mixture with 4% of hydrogen and 6000 ppm of H$_2$O;

average defect rate: ≈65%

For a fourth example, the operating conditions and the results obtained are as follows:

the initial mixture converted in the first and second apparatuses: 17 m$^3$/h of an N$_2$/H$_2$ mixture with 4% of hydrogen;

initial mixture converted in the third apparatus (34): 17 m$^3$/h of an N$_2$/H$_2$O mixture with 400 ppm of H$_2$O;

average defect rate: close to 100%

The results described above illustrate the very substantial improvement in the results observed on the points of the circuit which are most difficult to solder (wired components, metallized holes) in the presence of water vapor in the initial mixture treated in one of the apparatuses.

As previously mentioned, the water vapor content of the initial gas mixture, should be adapted in each case, in particular to the content of the rest of the initial gas mixture (here to the hydrogen content adopted), and also to the type of article to be treated (here to the complexity of the soldered joints to be made and to the finishing used for the electronic circuit).

Specifically, it appears in this case that, taking into account all of the conditions employed, it is advantageous to locate the water vapor content of the initial gas mixture at close to 1000 ppm, and therefore in the range [500 ppm, 5000 ppm].

It is also observed that, for the case proposed, it is desirable to ensure the presence of a few % of hydrogen in the initial gas mixture, 4% representing a very reasonable concentration which is acceptable both economically and from the point of view of safety.

Comparative tests (all other conditions kept constant) for this same circuit made it possible to demonstrate that an increase in the hydrogen content (for example to 20%) did not significantly improve the results.

Although the present invention has been described with reference to particular embodiments, it is in no way limited thereby but, on the contrary, is susceptible of modifications and variants which will be apparent to the person skilled in the art.

We claim:

1. A method for dry fluxing at least one metallic surface of an article comprising the steps of:

a) passing at least one initial gas mixture comprising (1) at least one of an inert gas and a reducing gas and (2) an oxidizing gas mixture comprising water vapor into at least one apparatus for forming excited or unstable gas species, said initial gas mixture including 50 ppm to 6% water vapor;

b) converting said at least one initial gas mixture to at least one primary gas mixture comprising excited or unstable gas species; and c) treating the surface to be fluxed, at a pressure close to atmospheric pressure, with a gaseous treatment atmosphere comprising excited or unstable gas species and substantially free of electrically charged species obtained from said primary gas mixture.

2. The method according to claim 1 wherein said gaseous treatment atmosphere comprises said primary gas mixture and an adjacent gas mixture which has not been passed through said apparatus.

3. The method according to claim 1 wherein said initial gas mixture includes between about 100 ppm and 1% water vapor.

4. The method according to claim 1 wherein said initial gas mixture includes between about 500 ppm and 5,000 ppm water vapor.

5. The method according to claim 1 wherein said oxidizing gas mixture further comprises oxygen, in addition to water vapor.

6. The method according to claim 1 wherein said initial gas mixture comprises a mixture of nitrogen, hydrogen and water vapor.

7. The method according to claim 5 wherein said initial gas mixture comprises a mixture of nitrogen, hydrogen, water vapor and oxygen mixture.

8. The method according to claim 1 wherein said initial gas mixture comprises between about 1000 ppm and 50% hydrogen.

9. The method according to claim 1, wherein said initial gas mixture comprises less than or equal to about 10% hydrogen.

10. The method according to claim 1 further comprising, during the treatment step (c), heating the article to be treated to a temperature of between about ambient temperature and the melting temperature of the alloy used in order to carry out a subsequent soldering or tinning operation.

11. The method according to claim 10 wherein the melting temperature of said alloy is close to about 180° C., and wherein the temperature to which the article to be treated is heated does not exceed about 160° C.

12. The method according to claim 1 wherein said treating step (c) further comprises the step of conveying said article having the at least one metallic surface to be treated through an internal space which is isolated from a surrounding atmosphere, said isolated internal space being connected in a leaktight manner to said apparatus or including said apparatus.

13. The method according to claim 1 wherein said treating step (c) further comprises the step of conveying said article having the at least one metallic surface to be treated for treatment by a plurality of gaseous treatment atmospheres produced by a plurality of apparatuses placed in parallel over the width of the article and/or successively by a plurality of gaseous treatment atmospheres produced by a plurality of apparatuses placed in series, by a conveyor system which passes through an internal space which is isolated from a surrounding atmosphere, said internal space being connected in a leaktight manner to said apparatuses or including said apparatuses.

14. The method according to claim 2 wherein said treating step (c) further comprises the step of conveying said article having the at least one metallic surface to be treated for treatment by a plurality of gaseous treatment atmospheres produced by a plurality of apparatuses placed in parallel over the width of the article and/or successively by a plurality of gaseous treatment atmospheres produced by a plurality of apparatuses placed in series, by a conveyor system which passes through an internal space which is isolated from a surrounding atmosphere, said internal space being connected in a leaktight manner to said apparatuses or including said apparatuses.

15. The method according to claims 12 or 13 wherein said at least one apparatus is a seat of an electric discharge created between a first electrode and a second electrode, a layer of a dielectric material being arranged on a surface of at least one of the electrodes, facing the other electrode, wherein said step (b) of converting the initial gas mixture is carried out by passing the initial gas mixture through the discharge transversely to the electrodes.

16. The method according to claim 15 wherein said apparatus uses greater than or equal to about 1 W/cm$^2$ of power, normalized to unit surface area of dielectric.

17. The method according to claim 16 wherein said apparatus uses greater than or equal to about 10 W/cm$^2$.

18. The method according to claim 13 further comprising the step of zoning the treatment atmosphere successively encountered by the article to be treated along the conveyor in the following manner: at least one of the apparatuses for forming excited or unstable gas species converts a different initial gas mixture from that converted by the apparatus preceding it.

19. The method according to claim 14 wherein the treatment atmosphere successively encountered by the article to be treated along the conveyor is zoned in the following manner:
   i) at least one of the apparatuses for forming excited or unstable gas species converts a different initial gas mixture from that converted by the apparatus preceding it; and/or
   ii) the adjacent gas mixture employed in at least one of the apparatuses for forming excited or unstable gas species is different from that employed in the apparatus preceding it in said structure.

20. The method according to claim 15 wherein the steps i) and ii) take place within one and the same apparatus.

21. The method according to claim 12 further comprising the step of transporting the article from said internal space to a machine in which a soldering or tinning operation is carried out, the article being, if appropriate, kept under a protective atmosphere between an exit of said internal space and an entry of said machine.

22. The method according to claim 12 wherein a soldering or tinning operation is carried out within the same internal space, downstream of said apparatus or of said apparatuses.

23. The method according to claims 21 or 22, wherein the article having the metallic surface to be treated is an electronic circuit, the method further comprising carrying out said subsequent soldering or tinning operation in wave mode by bringing the circuit into contact with at least one wave of a liquid solder alloy, each face of the circuit being previously treated with at least one gaseous treatment atmosphere of at least one of said apparatuses for forming excited or unstable gas species, by said conveyor system.

24. The method according to claim 23 further comprising the step, downstream of said contact with the solder wave or waves, of bringing at least one of the faces of the circuit in front of at least one primary gas atmosphere of at least one downstream apparatus for forming excited or unstable gas species, through which a downstream initial gas mixture comprising (i) at least one of an inert gas and a reducing gas and (ii) an oxidizing gas is passed, in order to obtain the downstream primary gas mixture, comprising excited or unstable gas species and substantially free of electrically charged species.

25. The method according to claim 22, characterized in that, during all or part of the said contact with the solder wave or waves, at least one of the faces of the circuit is in contact with the gas outlet of at least one additional apparatus for forming excited or unstable gas species, through which an additional initial gas mixture, comprising an inert gas and/or a reducing gas and/or an oxidizing gas, is passed in order to obtain, at the gas outlet of the apparatus, an additional primary gas mixture, comprising excited or unstable gas species and substantially free of electrically charged species.

26. The method according to claim 21 further comprising the step of detecting arrival of the circuit upstream of or at an entry of said internal space and initiating at least one of the following measures as a result of an intentional action by a user or because no circuit has been detected at the entry of said internal space during a predetermined time period:

stopping supply of primary gas mixture to each of the said apparatuses;

maintaining in each apparatus a reduced flow rate of the primary gas mixture which circulates in the apparatus in question;

passing a standby primary gas mixture through each apparatus instead of the primary gas mixture which circulates in the apparatus in question;

stopping supply of adjacent gas mixture employed in at least one of said apparatuses;

placing each apparatus in standby mode, in which power density used therein is only a few $W/cm^2$.

27. The method according to claim 1, wherein said initial gas mixture comprises $CO_2$.

28. The method according to claim 1, wherein said initial gas mixture comprises ammonia.

29. The method according to claim 1, further comprising the step of recycling all or a part of the treatment atmosphere of step c) to form all or a part of said initial gas mixture.

30. The method according to claim 29, wherein said recycling step comprises recirculating said treatment gas with a fan or by using a venturi effect.

31. The process according to claim 28, wherein ammonia is present in said treatment gas and recycled to said initial gas mixture.

\* \* \* \* \*